United States Patent [19]

Kemp

[11] Patent Number: 4,986,486

[45] Date of Patent: Jan. 22, 1991

[54] SPOOL WITH CLIP FOR ATTACHING A WEB TO THE SPOOL

[75] Inventor: David B. Kemp, Fairport, N.Y.

[73] Assignee: Eastman Kodak Company, Rochester, N.Y.

[21] Appl. No.: 430,541

[22] Filed: Nov. 2, 1989

[51] Int. Cl.$^5$ ................. B65H 75/28; G03B 1/04
[52] U.S. Cl. .................. 242/74.100; 242/74; 242/74.2; 242/71
[58] Field of Search .......... 242/74, 74.1, 74.2, 242/125.1, 125.2, 107, 84.1 K, 71, 71.5, 71.8; 160/327, 328

[56] References Cited

U.S. PATENT DOCUMENTS

| | | | |
|---|---|---|---|
| 661,504 | 11/1900 | Ellman | 242/74 |
| 700,445 | 5/1902 | Shepard | 242/74.2 |
| 707,098 | 8/1902 | Garrison | |
| 785,822 | 3/1905 | Mitchem | 242/74 |
| 1,871,983 | 8/1932 | Goldhammer | 242/74 |
| 1,962,959 | 1/1933 | Kinlock | 242/74.1 |
| 3,065,838 | 11/1962 | Biedinger et al. | 197/175 |
| 3,321,149 | 3/1966 | Andersen et al. | 242/74 |
| 3,323,743 | 9/1965 | Landgraf | 242/68.3 |
| 3,752,209 | 8/1973 | Swanson | 189/142 |
| 4,018,398 | 4/1977 | Louzil | 242/74.1 |

FOREIGN PATENT DOCUMENTS

| | | | |
|---|---|---|---|
| 697532 | 4/1951 | United Kingdom | 242/74 |
| 820371 | 11/1951 | Fed. Rep. of Germany | 242/74.2 |

Primary Examiner—William A. Cuchlinski, Jr.
Assistant Examiner—Joseph A. Rhoa
Attorney, Agent, or Firm—Charles E. Snee, III

[57] ABSTRACT

A spool (10) has a first elongate slot (22) in an outer surface (12) of the spool (10) core for receiving an end portion (14a) of a strip (14) of web material, such as a strip of photographic film. The core surface has another elongate slot (24) for receiving the flange (26b) of a clip (26) used for retaining the web material on the spool. The clip has a semi-cylindrical portion (26a) that surrounds the spool core and holds part of the web material against the core surface.

5 Claims, 1 Drawing Sheet

SPOOL WITH CLIP FOR ATTACHING A WEB TO THE SPOOL

BACKGROUND OF THE INVENTION

This invention relates to a spool on which a web material, such as photographic film, can be wound. More particularly, the invention relates to such a spool in which the full width of the end portion of the film or other web material is attached to the spool core and the film extends tangentially from the spool core.

Various techniques have been used to attach the end of a strip of film or other web material to a spool. For example, a film end can be attached to a spool by means of a piece of adhesive tape. Also, the end portion of the film can have one or more openings therein and can be inserted into a slot that extends through a spool. Such a spool has one or more teeth or hooks in the slot for engaging the film strip through the openings. Clips have also been used for attaching webs of various kinds to a spool core. After the end of the web is attached to the spool, the spool is rotated to wind a predetermined length of the web onto the spool. Ordinarily removal of the web from the spool is accomplished by pulling the end of the web opposite from its attachment to the spool away from the spool. More specifically, the free end of the web can project through a slot in a cassette where it is engaged by a mechanism in a camera or film processor for withdrawing film from the cassette. However, in some instances it is desired to drive the film out of a cassette by rotating the film spool within the cassette. In order to thrust the film out of the cassette in this manner, a force must be exerted on the film in its lengthwise direction. If the film is attached by conventional methods, such as an adhesive tape or by inserting a film end into a slot and engaging it with hooks in the slot, there is not sufficient rigidity or beam strength to effect thrusting of the free end of the film out of the cassette.

SUMMARY OF THE INVENTION

It is an object of the invention to provide an improved spool and clip for attaching an end portion of a strip of film or other web material to a spool in a way which enhances thrusting of the film strip or web material from a cassette.

The invention relates to a spool for a strip of web material, such as a strip of film. The spool has a core with an outer surface on which the web material is to be wound. A first elongate slot in the outer surface extends in an axial direction for receiving an end portion of the web material. A second elongate slot in the outer surface extends in an axial direction, the second slot being spaced from the first slot about the circumference of the core. A flexible clip has a substantially semi-cylindrical portion and a flange portion projecting in a generally radially inwardly direction from an axially extending edge of the semi-cylindrical portion. The flange portion is positionable in the second slot after the end portion of the web material is inserted into first slot. The cylindrical portion of the clip is engageable with the outer surface between the slots and with part of the web material adjacent the first slot to hold such part of the web material against the outer surface, thereby attaching the web material to the core.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

In the following description the invention will be discussed with respect to its use with 35mm photographic film. However, it will be understood that the invention is also usable with other types of film and web materials.

Figure 1:
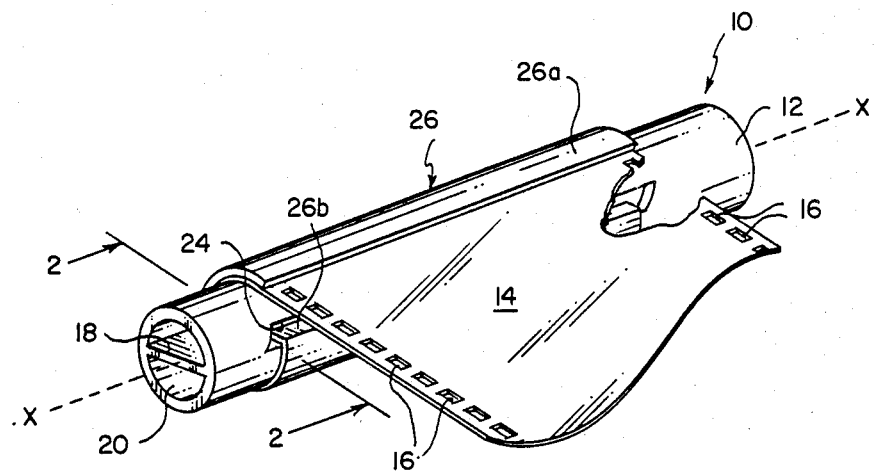
FIG. 1 s a perspective view showing a strip of photographic film attached to a spool of the invention.

Referring now to the drawing in detail, a spool of the invention is generally designated 10 and has a core with an outer surface 12 on which a strip of film 14 is wound. The film may have a plurality of perforations 16 along one or both side edges thereof in a conventional manner. As shown in FIG. 1, a keying rib 18 can be provided in an opening 20 at one end of the spool, and a similar keying arrangement can be provided in the other end (not shown) if desired. Rib 18 can be engaged for rotating the spool about its axis x—x. Such rotation can be used for winding the film 14 onto the spool or for driving the spool in an unwinding direction. Flanges (not shown) can be provided at end portions of the spool core adjacent the side edges of the film in a conventional manner.

One end portion 14a of the film 14 needs to be attached to the spool core for winding film onto the spool or unwinding film from the spool For this purpose an elongate slot 22 (FIGS. 2 and 3) is provided through outer surface 12 of the core and extends radially inwardly toward the axis of the spool. Slot 22 also extends in an axial direction along the spool a substantial distance. End portion 14a of the film strip is inserted into the slot 22 and then wrapped partially around surface 12 in a clockwise direction as viewed in FIGS. 1 and 2. The width of end portion 14a of the film strip may be the same width as the other portions of the web, as shown in the drawings. Alternatively, end portion 14a may comprise a narrowed tongue having a width less than the other portions of the film, as disclosed in U.S. Pat. No. 4,852,821, issued on Aug. 1, 1989 in the name of Clark E. Harris et al. The length of slot 22 can vary depending on the width of the end portion of the web to be inserted into the slot. Slot 22 is at least as long as the width of end portion 14a that is to be inserted into the slot. When only a narrow tongue portion is inserted int eh slot, shoulders (not shown) can be provided along side edge portions of the spool to support the edges of the full-width part of the film strip, as known in the art. The shoulders can be tapered, as disclosed in the before-mentioned U.S. Pat. No. 4,852,821, or cylindrical in shape.

Figure 3:
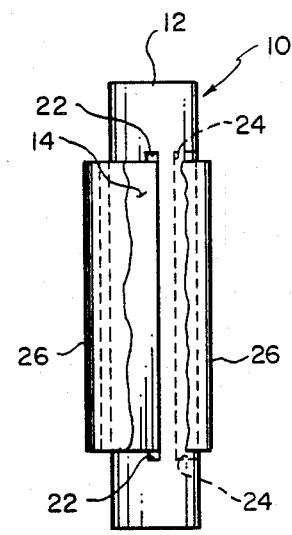
FIG. 3 is an elevation view along line 3—3 of FIG. 2, with part of the clip cut away to better illustrate the attachment of the film to the spool.

A second elongate slot 24 is provided through outer surface 12 of the spool core. Slot 24 also extends in a radial direction toward the axis of the spool and terminates in spaced relation to the slot 22. Slot 24 also extends in an axial direction along the length of the spool core by a distance substantially equal to the length of the slot 22 as shown in FIG. 3. Slots 22 and 24 are spaced from each other about the circumference of the core surface 12 and, preferably,. slot 24 is spaced about 90° from slot 22 in a direction opposite to the direction of the film as it is wound around the surface 12.

A flexible clip 26 is provided for holding the end portion of the film strip 14 onto the spool. Clip 26 comprises a substantially semi-cylindrical portion 26a and a flat flange portion 26b which projects in a generally radially inwardly direction toward the axis of the cylindrical portion 26a. Flange 26b is located along one axially extending edge of the cylindrical portion an is dimensioned so that it will fit in the slot 24 of the spool core. Semi-cylindrical portion 26a of the clip has a radius that is substantially equal to, or slightly smaller than, the radius of the cylindrical outer surface 12 of the core. Both the semi-cylindrical portion 26a of the clip and the flange portion 26b preferably extend along the spool 10 for a distance substantially equal to the width of the film 14 to be attached to the spool, as shown in FIGS. 1 and 3.

Figure 2:
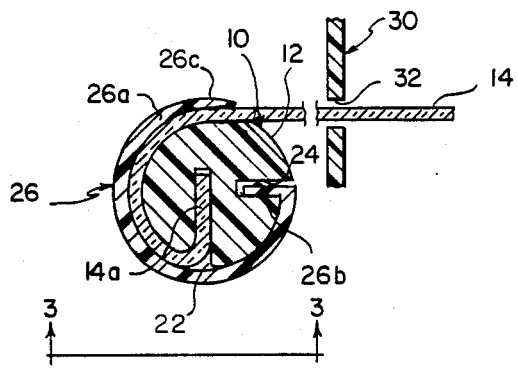
FIG. 2 is an enlarged cross-section view taken along line 2—2 of FIG. 1.

Referring to FIG. 2, the outer surface of portion 26a of the clip at the axially extending edge opposite flange 26b is tapered or curved, as shown at 26c, to a thin edge. This shape of surface 26c enables the second convolution of film, as it is wound onto the spool, to encounter a smooth transition from clip surface 26c onto the outer surface of the first convolution of the film. In the absence of surface 26c the second convolution would encounter a step at the edge of the clip that could produce undesirable pressure marks in the film. Similarly, core surface 12 is stepped on opposite sides of slots 22, 24 to provide a smooth transition for the film as it passes over the slots. These steps in surface 12, together with the clip surface portion 26c, produce a generally cylindrical surface onto which the film can be wound and avoid undesirable pressure marks in the film.

In order to attach the film 14 to the spool 10, the end 14a of the film is inserted into slot 22 and wrapped around the surface 12 about 90 degrees in a clockwise direction as viewed in FIGS. 1 and 2. Then, while the film is held in this position, the flange 26b of the clip 26 is inserted in slot 24 and the semi-cylindrical portion 26a is snapped around the spool. A part of clip portion 26a contacts the surface 12 of the spool between the slot 24 and slot 22, and another part extends around the end portion of the film between the slot 22 and the uppermost end of the clip. As illustrated in FIG. 2, the semi-cylindrical portion 26a of the clip extends about 180° around the spool and the film from the slot 22. The clip extends along the spool by a distance approximately equal to the width of the film, thereby increasing the beam strength of the film.

With the end of the film attached to the spool, the spool can be rotated in a counter clockwise direction to wind a number of convolutions of film onto the spool. Then the spool with the film thereon can be inserted into a cassette of a known type. A small portion of a cassette is illustrated at 30 in FIG. 2, and it comprises a slot 32 through which the film is fed from the cassette into a camera. Cassette 30 can be of various types, including one in which the entire length of the film strip is contained within the cassette during shipment. AFter the cassette is loaded in a the camera, film is driven out of the cassette through slot 22 into the camera for exposure. One example of a cassette of this kind is disclosed in U.S. Pat. No. 4,832,275, issued May 23, 1989 in the name of J. C. Robertson and entitled "Film Cassette."

For cassettes of this kind it is important for the film to have a high beam strength, and bending of the film strip in the area where it is attached to the film spool should be avoided so that the force resulting from clockwise rotation of the spool (as shown in FIG. 2) will be more efficiently directed toward driving the film out of the cassette. Attachment of the film to the spool by means of the clip 26 holds the film strip against the spool for the full width of the film, thus increasing the beam strength of the film. In addition, the clip attaches the film to the spool so that the film projects tangentially away from the spool, and this decreases the propensity of the film to bend when it is driven in an unwinding direction. Both of these advantages are achieved by the simple but effective structure of the invention.

The invention has been described in detail with particular reference to a preferred embodiment thereof, but it will be understood that variations and modifications can be effected within the spirit and scope of the invention.

I claim:

1. In a spool for a strip of web material, such as a strip of photographic film, the spool having an elongate core with an outer surface on which the web material is to be wound, the improvement comprising:

a first elongate slot, extending through said outer surface and in an axial direction, for receiving an end portion of the web material;

a second elongate slot, extending through said outer surface and in an axial direction, said second slot being spaced from said first slot about the circumference of said outer surface; and flexible clip means comprising a substantial semi-cylindrical portion having a flange portion projecting in a generally radially inward direction from an axially extending edge of said semi-cylindrical portion, said flange portion being positionable in said second slot after an end portion of the web material has been inserted into said first slot, and said semi-cylindrical portion of said clip means being engageable with said outer surface between said slots and with part of the web material adjacent said first slot to hold such part of the web material against said outer surface, for securing the end portion of the web material against movement beneath said semi-cylindrical portion of said clip means during rotation of said spool in either direction and for attaching the end portion of the web material to said core with the web material extending tangentially from said outer surface, whereby said spool may be rotated in the direction from said first slot toward said second slot to wind the web material onto said spool or in the opposite direction to thrust the web material from said spool.

2. A spool as set forth in claim 1, wherein the strip of web material has a width and said first slot extends in said axial direction a distance substantially equal to such width of the web material, whereby such width of the web material can be inserted into said first slot to increase the beam strength of the web material during rotation of the spool in said opposite direction.

3. A spool as set forth in claim 1, wherein the strip of material has a width of said clip means extends axially along the spool for a distance substantially equal to such width of the web material to be wound onto the spool.

4. A spool as set forth in claim 3, wherein said semi-cylindrical portion extends in a circumferential direction about 90 degrees along the surface of the spool between said slots and another about 180 degrees past said first slot over the web material to hold the web material against said outer surface.

5. A spool as set forth in claim 1, wherein the shape of said outer surface and said clip means jointly define a substantially cylindrical surface free of significant steps that might produce pressure marks in the web material when it is wound onto the spool.

* * * * *